Oct. 25, 1966 J. O. PORTEOUS 3,280,940
SAFETY CONTROL DEVICE FOR MACHINES
Filed Oct. 29, 1964 2 Sheets-Sheet 1
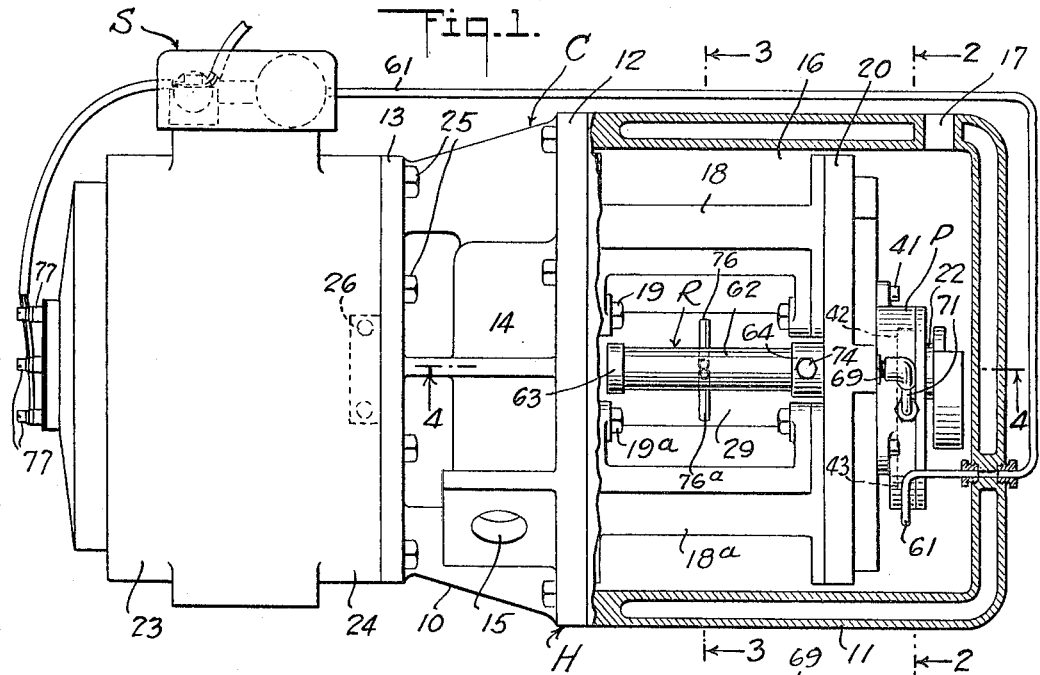
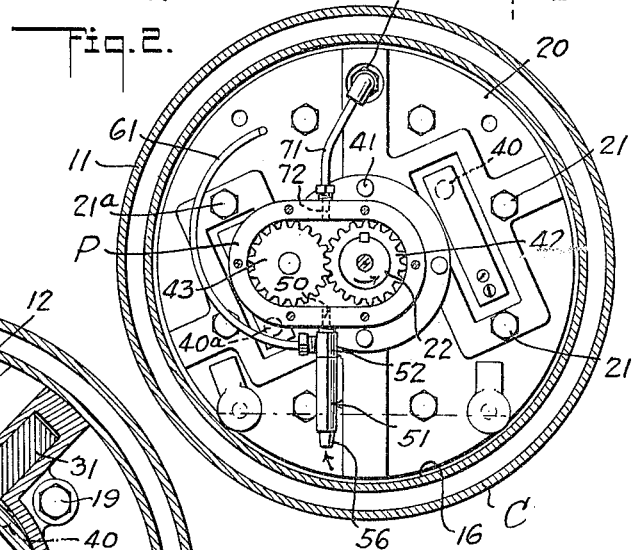
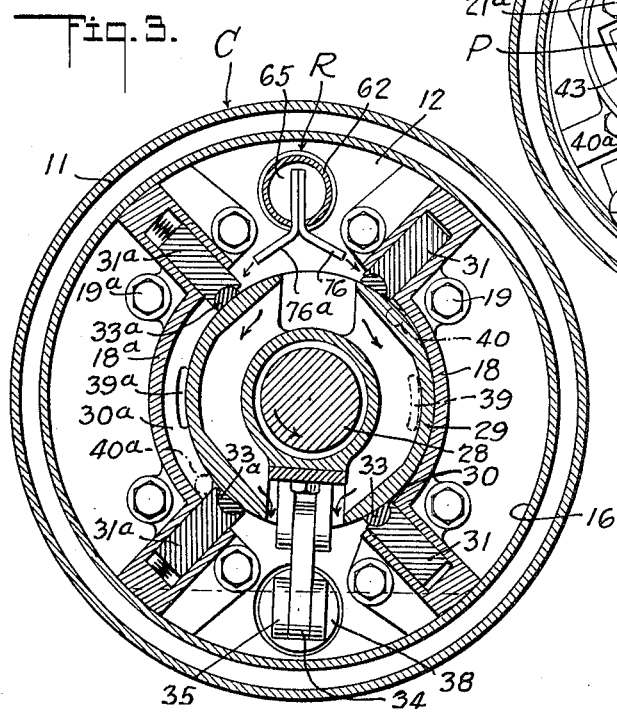
INVENTOR
JOHN O. PORTEOUS
BY
Frederick Diehl
ATTORNEY

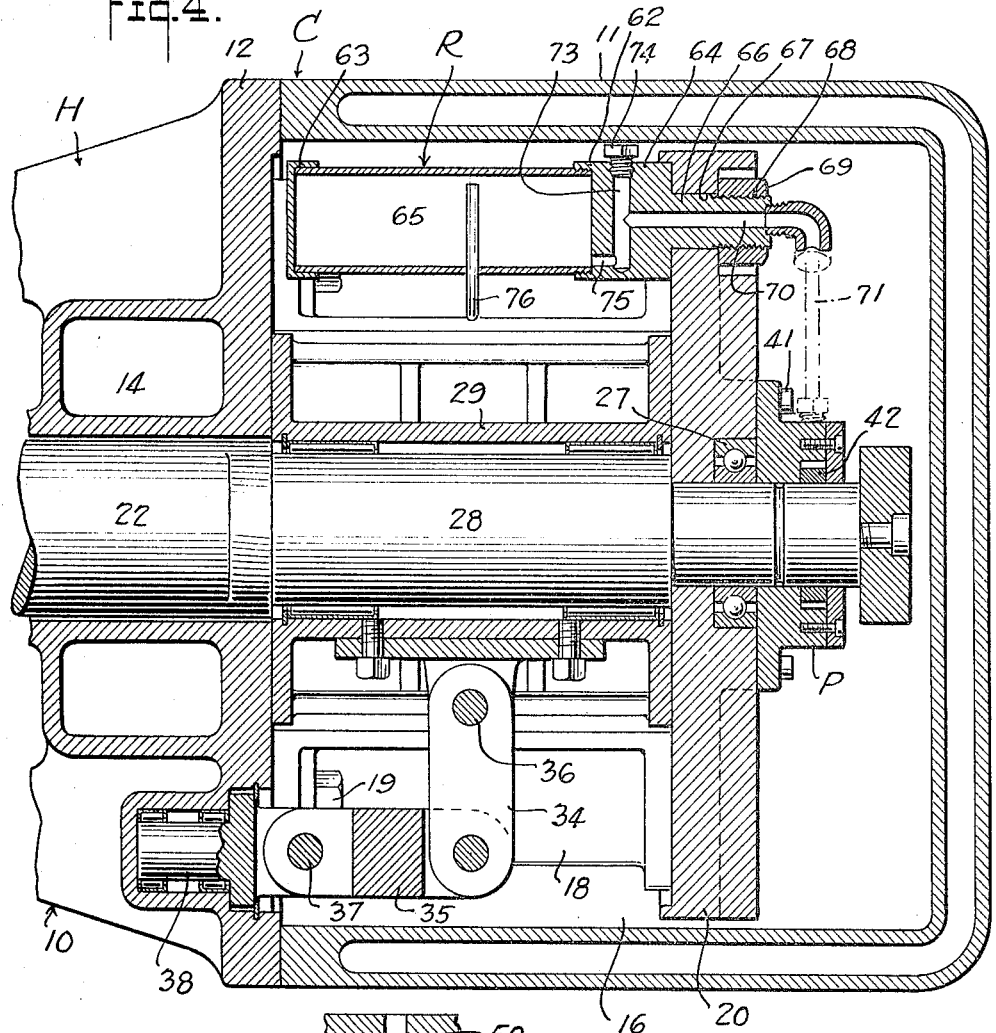
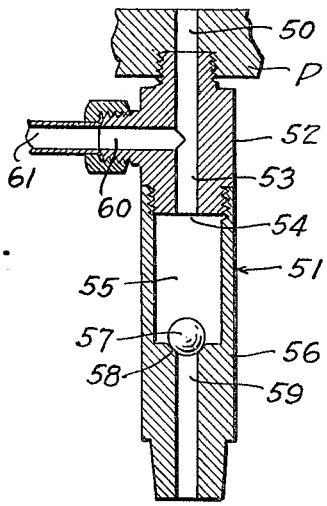

United States Patent Office 3,280,940
Patented Oct. 25, 1966

3,280,940
SAFETY CONTROL DEVICE FOR MACHINES
John O. Porteous, Pasadena, Calif., assignor of one-half to David F. Thomas, Altadena, Calif.
Filed Oct. 29, 1964, Ser. No. 407,435
9 Claims. (Cl. 184—6)

My invention relates generally to safety devices for protecting machines against damage resulting from incorrectly connecting a machine to a source of power, by automatically discontinuing the supply of power to the machine.

An object of my invention is to provide a safety control device which, in association with a machine embodying a rotary pump driven thereby and capable of supplying lubricant to working parts of the machine only when the machine is being driven in a predetermined direction, utilizes the pump as a source of energy to instantly discontinue operation of the machine should it be driven in the reverse direction with the attendant failure of the pump to supply lubricant to the working parts, to thus positively prevent damage to the machine from lack of lubrication.

Another object of my invention is to provide a safety control device of the above described character particularly adapted, although not necessarily, for use with my invention as described and claimed in my co-pending application for patent on a High Pressure and High Temperature Refrigerant Vapor Compressor, Serial No. 324,364, filed November 18, 1963, and embodying a rotary oil pump driven by the compressor to deliver lubricant to working parts of the compressor only when the latter is being driven in a predetermined direction of rotation, so that with a polyphase electric motor, as an example, being used to drive the compressor, any incorrect connection of the source of polyphase current to the terminals of the motor causing the compressor to be driven in the reverse direction, will react upon the pump by reversing the suction and pressure sides thereof, which is utilized in a manner for the reverse circulation of oil to discontinue the supply of current to the motor either directly or through the medium of a conventional pressure unit operatively associated with the compressor.

A further object of my invention is to provide a safety control device as above set forth embodying a chamber in which a quantity of lubricant for emergency use is retained during cirulation of lubricant through the chamber to working parts of the machine when the machine is being driven in a predetermined direction, and is caused to be pumped from the chamber and its energy utilized in a manner to discontinue the supply of power to the machine should the machine be driven in other than the predetermined direction with the attendant reversal of the pump.

With these and other objects in view, my invention resides in the combinations, arrangements and functional relationships of elements as set forth in the following specification and particularly pointed out in the appended claims.

In the accompanying drawings,

FIGURE 1 is a view showing in plan and partly in section, a refrigerant compressor with one form of safety control device embodying my invention applied thereto;

FIGURE 2 is a vertical transverse sectional view taken on the line 2—2 of FIGURE 1;

FIGURE 3 is an enlarged vertical transverse sectional view taken on the line 3—3 of FIGURE 1;

FIGURE 4 is a further enlarged vertical longitudinal sectional view taken on the line 4—4 of FIGURE 1, and FIGURE 5 is a detail view in longitudinal section, of a valve element embodied in my safety control device.

Referring specifically to the drawings, my invention in its present embodiment is shown for the purpose of illustration associated with a refrigerant compressor C as disclosed in my copending application for patent, Serial No. 324,364, filed Nov. 19, 1963, above referred to. In its broad aspect this compressor comprises a housing H composed of a support 10 and a cover 11, the support including heads 12 and 13 between which is a low pressure chamber 14 having an inlet 15 (FIGURE 1) for connection to the low pressure side of a refrigerant circulating system. The cover 11 co-acts with the head 12 to form a high pressure chamber 16 having an outlet 17 which may be controlled by a standard pressure-responsive refrigerant shutoff or service valve. Stator elements 18 and 18a of identical construction are secured at one end to the head 12 by cap screws 19 and 19a and are secured at the other end to a head 20 by cap screws 21 and 21a.

A drive shaft 22 constitutes the armature shaft of a polyphase electric motor 23 whose casing 24 is secured to the head 13 by cap screws 25. The shaft 22 is journaled in bearings 26 and 27 in the heads 13 and 20, respectively, with the portion of the length of the shaft spanning the space between the heads 12 and 20 being constructed to provide a cam 28 in the form of an eccentric. Mounted on the cam 28 is a cylindrical piston 29 which co-acts with the stator elements 18, 18a to form working chambers 30, 30a between spring-urged vanes 31, 31 and 31a, 31a, respectively, slidably mounted in the respective stator elements and provided with sealing shoes 33, 33a, bearing on the periphery of the piston 29. Pivotally connected links 34, 35 are connected at 36 and 37, respectively, to the piston and to a pivotally mounted anchor pin 38 for co-action therewith in restricting movement of the piston on the cam 28 to a predetermined angle of oscillation as the shaft 22 rotates.

Intake ports 39 and 39a (FIGURE 3) in the head 12 connect the low pressure chamber 14 with the working chambers 30, 30a respectively, whereas check valve controlled exhaust ports 40 and 40a in the head 20 connect the respective working chambers to the high pressure chamber 16. An oil pump for supplying lubricant to working parts of the compressor is secured by screws 41 to the head 20 and has meshing gears 42 and 43, the former of which is keyed to the drive shaft 22 so as to be driven thereby.

In carrying my invention into practice, the inlet 50 of the pump P is controlled by a valve element 51 composed of a T fitting 52 (FIGURE 5) fastened to the pump, with the longitudinal bore 53 of the fitting opening at one end to the pump inlet 50 and at its other end to the outlet 54 of a valve chamber 55 in a suction tube 56 having an inwardly opening ball check valve 57 adapted to engage a seat 58 to close the inlet 59 of the chamber. The lateral bore 60 of the fitting 52 is connected by a conduit 61 to a pressure-responsive switch S (FIGURE 1) such as the Series 270–271 manufactured by Penn Controls, Inc. of Goshen, Indiana, for controlling the supply of polyphase electric current to the motor 23.

A receptacle R through which oil is circulated by the pump P to various working parts of the compressor C by the motor 23 when driving the shaft 22 in a predetermined direction, comprises a cylindrical tube 62 closed at one end by a cap 63 and at the other end by a head 64 to form an oil chamber 65. The head 64 is provided with a stem 66 passing through an opening 67 in the head 20 of the compressor and is externally screw threaded at 68 to receive a nut 69, which, when tightened, rigidly supports the receptacle R horizontally between the heads 20 and 12 in the upper portion of the high pressure chamber 16 as clearly shown in FIGURES 3 and 4.

The head 64 is provided with an inlet passage 70 which is connected by a conduit 71 to the outlet 72 of the pump P. A priming passage 73 is closed at its upper end by a plug 74, connects with the passage 70 and with an outlet port 75 located in the head at the lowermost point in the chamber so as to form a trap in coaction with the inlet passage 70 at a higher lever than the port 75 and thus enable an emergency supply of oil to be retained in the chamber 65 whenever operation of the compressor is discontinued. Oil delivery conduits 76 and 76a forming outlets from the chamber 65 extend from a point adjacent to the top of the latter through the bottom thereof to points adjacent to the periphery of the piston 29 exteriorly of the working chambers 30 and 30a.

The operation of the invention is as follows:

Prior to assembling of the cover 11 to the support 10, a quantity of oil such as is used to lubricate the working parts of the compressor C is supplied to the chamber 65 through the priming passage 73 and is retained in the chamber by the action of the trap as above described. The plug 74 is now screwed into the passage 73 and the cover 11 then installed, after which oil is supplied to the high pressure chamber 16 to the level of the phantom line shown in FIGURE 2.

Assuming that the connection of the conductors from the 3-phase source of current supply have been correctly made to the motor terminals 77 (FIGURE 1) so as to cause the armature shaft 22 to be driven in the counter-clockwise direction shown by the arrows in FIGURES 2 and 3, the suction induced by the pump P will suck oil from the reservoir thereof in the high pressure chamber 16 in which the lower end of the valve element 51 is immersed as shown in FIGURE 2, by opening the check valve 57 so as to pump the oil through the conduit 71 to the chamber 65 from which the oil is delivered by the conduits 76 and 76a to the piston 29.

However, should the phase connections to the motor terminals 77 be incorrectly made so as to cause the armature shaft 22 to be reversely driven in the clockwise direction as viewed in FIGURE 2, the operation of the pump P will accordingly be reversed. Oil will now be sucked from the emergency supply thereof in the chamber 65 by the pump and pumped through the conduit 71 into the valve chamber 55, thus forcing the check valve 57 to close and the oil to be pumped through the conduit 61 so as to activate the pressure responsive switch S which will open to discontinue the supply of current to the motor 23.

It will be manifest that unless the polyphase connections to the motor 23 have been correctly made for the pump P to be driven in the predetermined direction of rotation necessary for the pump to supply lubricant to the working parts of the compressor C, that the supply of current to the motor will be instantly discontinued by utilizing the pressure of the oil being reversely circulated by the pump, to open the pressure responsive switch.

I claim:

1. In a polyphase electric power driven machine having a rotary pump driven by the machine to circulate lubricant to working parts of the machine only when the machine is being driven in a predetermined direction, and a fluid-pressure responsive switch controlling the supply of current to the machine, means defining a conduit adapted to connect said pump to said switch; means defining a chamber adapted to be connected to said pump, to which a supply of lubricant is delivered by the pump during circulation of lubricant to working parts of said machine; and means operable to cause lubricant to be pumped from said chamber through said conduit to said switch to actuate same and discontinue the supply of current to the machine should the polyphase connections to the machine be so made that the machine will be driven in a direction reverse to said predetermined direction.

2. The combination as embodied in claim 1 wherein said chamber is provided with an inlet and outlet vertically related to provide a trap for co-action in enabling an emergency supply of oil to be retained in said chamber when the machine is not operating.

3. The combination as embodied in claim 1 wherein said chamber is provided with an inlet and outlet vertically related to provide a trap for co-action in enabling an emergency supply of oil to be retained in said chamber when the machine is not operating; said chamber having a priming opening provided with a removable closure to enable the emergency supply of lubricant to be supplied to the chamber.

4. In a polyphase electric power driven machine having a rotary pump driven by the machine to circulate lubricant to working parts of the machine only when the machine is being driven in a predetermined direction, and a fluid pressure responsive switch controlling the supply of current to said machine, means defining a conduit adapted to connect the intake side of said pump to said switch; means defining a chamber having an inlet adapted to be connected to the discharge side of said pump, and an outlet arranged to maintain a predetermined level of lubricant in the chamber for emergency use irrespective of pumping of lubricant from the outlet to working parts of the machine; and means operable to cause the pump to pump lubricant from said chamber through said inlet and conduit to said switch to actuate same and discontinue the supply of current to the machine should be polyphase current connections to the machine be so made that the machine will be driven in a direction reverse to said predetermined direction with the consequent reversal of the pump.

5. In a polyphase electric power driven machine having a rotary pump driven by the machine to circulate lubricant to working parts of the machine only when the machine is being driven in a predetermined direction, and a fluid pressure responsive switch controlling the supply of current to said machine, means defining a conduit adapted to connect the intake side of said pump to said switch; means defining a chamber having an inlet adapted to be connected to the discharge side of said pump, and an outlet arranged to maintain a quantity of lubricant in the chamber for emergency use irrespective of pumping of lubricant to working parts of the machine; and means including a check valve controlling said intake side of the pump, by which the pump will be caused to pump lubricant from said chamber through said inlet and said conduit to said switch to actuate same and discontinue the supply of current to the machine should the polyphase connections to the machine be so made that the machine will be driven in a direction reverse to said predetermined direction with the attendant reversal of the pump.

6. In a power driven machine having a pump driven by the machine to circulate lubricant to working parts of the machine only when the machine is being driven in a predetermined direction, and a fluid pressure responsive device controlling operation of said machine, means defining a chamber adapted to be connected to said pump, in which a quantity of lubricant for emergency use is retained during circulation of lubricant through the chamber to working parts of the machine; means adapted to connect said pump to said device; and means operable to cause lubricant from said emergency supply in said chamber to be pumped from the latter and through the last said means to said device to activate same and discontinue operation of the machine should the machine be driven in a direction reverse to said predetermined direction with the attendant reversal of the pump.

7. The combination with a power driven machine having a lubricant reservoir and a pump driven by the machine to circulate lubricant from the reservoir to working parts of the machine and back to the reservoir only when the machine is being driven in a predetermined direction, and a fluid pressure responsive device for controlling operation of the machine, of means defining a passage connecting the intake side of the pump to said device; means defining a chamber connected to the discharge side of said pump, and having means by which a quantity of lubricant is retained therein for emergency use during circulation of lubricant through the chamber to working parts of the machine by the pump; and valve means controlling the intake side of the pump by enabling lubricant to be pumped from said emergency supply and through said passage to said device to activate same and discontinue operation of the machine should the machine be driven in a direction reverse to that of said predetermined direction with the attendant reversal of the pump.

8. The combination with a polyphase motor compressor unit having a high pressure chamber forming a lubricant reservoir, and provided with a drive shaft and a rotary pump driven by the shaft in the high pressure chamber to circulate lubricant from the reservoir to working parts of the unit and back to the reservoir when the drive shaft is being driven by the motor in a predetermined direction, and a fluid pressure responsive switch controlling the supply of current to the motor, of a conduit connecting the intake of the pump to said switch; a receptacle providing a lubricant chamber supported in said high pressure chamber and having an inlet connected to the discharge side of said pump, and having an outlet arranged to co-act with said inlet in retaining a quantity of lubricant in said chamber for emergency use, during circulation of lubricant through the chamber by the pump to the working parts of the unit; and valve means controlling the intake side of said pump to admit lubricant thereto from the reservoir or close off the intake side from the reservoir according as the polyphase connections to the motor cause the drive shaft to be driven in said predetermined direction of rotation or in the reverse direction wherein the intake and discharge sides of the pump will be reversed to pump lubricant from the emergency supply in said chamber through its inlet and said conduit to said switch to actuate same and discontinue the supply of current to the motor.

9. The combination with a power driven machine having a lubricant reservoir and a pump driven by the machine to circulate lubricant from the reservoir to working parts of the machine and back to the reservoir only when the machine is being driven in a predetermined direction, and a fluid pressure responsive device controlling operation of the machine, of means defining a conduit connecting the intake side of said pump to said device; means defining a chamber connected to the discharge side of said pump and having means by which a quantity of lubricant is retained in the chamber for emergency use, during circulation of lubricant through the chamber to working parts of the machine by the pump; and valve means controlling the intake side of said pump to admit lubricant thereto from the reservoir or close off the intake side from the reservoir according as the machine is being driven in said predetermined direction or in the reverse direction wherein the intake and discharge sides of the pump will be reversed to pump lubricant from the emergency supply in said chamber through said conduit to said device to actuate same and discontinue operation of the machine.

References Cited by the Examiner
UNITED STATES PATENTS 2,675,514 4/1954 Smith.
2,857,491 10/1958 Harter _____ 184—6 X SAMUEL ROTHBERG, *Primary Examiner.*

H. S. BELL, JR., *Examiner.*